(12) United States Patent
Tian et al.

(10) Patent No.: US 8,411,389 B1
(45) Date of Patent: Apr. 2, 2013

(54) DISK DRIVE FLUID DYNAMIC BEARING SPINDLE

(75) Inventors: Jifang Tian, Fremont, CA (US); Jian Yang, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 289 days.

(21) Appl. No.: 12/826,640

(22) Filed: Jun. 29, 2010

(51) Int. Cl.
*G11B 17/02* (2006.01)

(52) U.S. Cl. .................... 360/99.08; 310/67 R

(58) Field of Classification Search ............. 360/99.08, 360/99.04, 99.03; 310/67 R, 90–91; 384/100, 384/107, 112, 115, 125
See application file for complete search history.

(56) References Cited

U.S. PATENT DOCUMENTS

| | | | |
|---|---|---|---|
| 4,300,806 A | 11/1981 | Heshmat | |
| 4,828,403 A | 5/1989 | Schwartzman | |
| 4,884,899 A | 12/1989 | Schwartzman | |
| 5,457,588 A | 10/1995 | Hattori et al. | |
| 5,471,104 A * | 11/1995 | Toshimitsu et al. | 310/90 |
| 5,675,201 A * | 10/1997 | Komura et al. | 310/90.5 |
| 5,895,120 A * | 4/1999 | Campbell et al. | 384/420 |
| 5,938,343 A | 8/1999 | Grantz et al. | |
| 6,020,664 A * | 2/2000 | Liu et al. | 310/90 |
| 6,361,214 B1 | 3/2002 | Ichiyama | |
| 6,592,262 B2 | 7/2003 | Rahman | |
| 6,664,687 B2 | 12/2003 | Ichiyama | |
| 6,686,674 B2 | 2/2004 | Ichiyama | |
| 6,756,715 B2 * | 6/2004 | Hirose et al. | 310/90 |
| 6,822,825 B2 | 11/2004 | Herndon et al. | |
| 6,854,889 B2 | 2/2005 | Nishimura et al. | |
| 7,021,829 B2 | 4/2006 | Tamaoka | |
| 7,056,026 B2 | 6/2006 | Grantz et al. | |
| 7,135,797 B2 | 11/2006 | Khan et al. | |
| 7,265,467 B2 | 9/2007 | Sumi | |
| 7,284,910 B2 | 10/2007 | Dittmer et al. | |
| 7,306,059 B2 | 12/2007 | Ide | |
| 7,345,392 B2 | 3/2008 | Hafen et al. | |
| 7,510,330 B2 | 3/2009 | Obara | |
| 7,775,719 B2 * | 8/2010 | Shishido et al. | 384/100 |
| 7,798,721 B2 * | 9/2010 | Shibahara et al. | 384/107 |
| 2003/0234589 A1 | 12/2003 | Parsoneault et al. | |
| 2008/0056105 A1 | 3/2008 | Aiello | |
| 2008/0075398 A1 | 3/2008 | Kimura et al. | |
| 2008/0273822 A1 | 11/2008 | Le et al. | |
| 2010/0053807 A1 | 3/2010 | LeBlanc et al. | |

* cited by examiner

*Primary Examiner* — Angel A. Castro

(57) ABSTRACT

Described herein is a disk drive with a fluid bearing having a sleeve defining a bore that extends through a portion of the sleeve along an axis defined by the bore. The sleeve can have a first contact surface that extends in a direction transverse to the axis. A spindle is rotationally received within the bore, and the spindle and the sleeve permit relative rotational movement when the spindle is positioned within the bore. The spindle has a stopper with a second contact surface that extends in a direction transverse to the axis when the spindle is positioned within the bore. A portion of at least one of the first and second contact surfaces includes a softer material than that of the spindle and the bearing sleeve, and the first and second contact surfaces are configured to engage each other upon relative axial movement between the spindle and the sleeve.

19 Claims, 6 Drawing Sheets

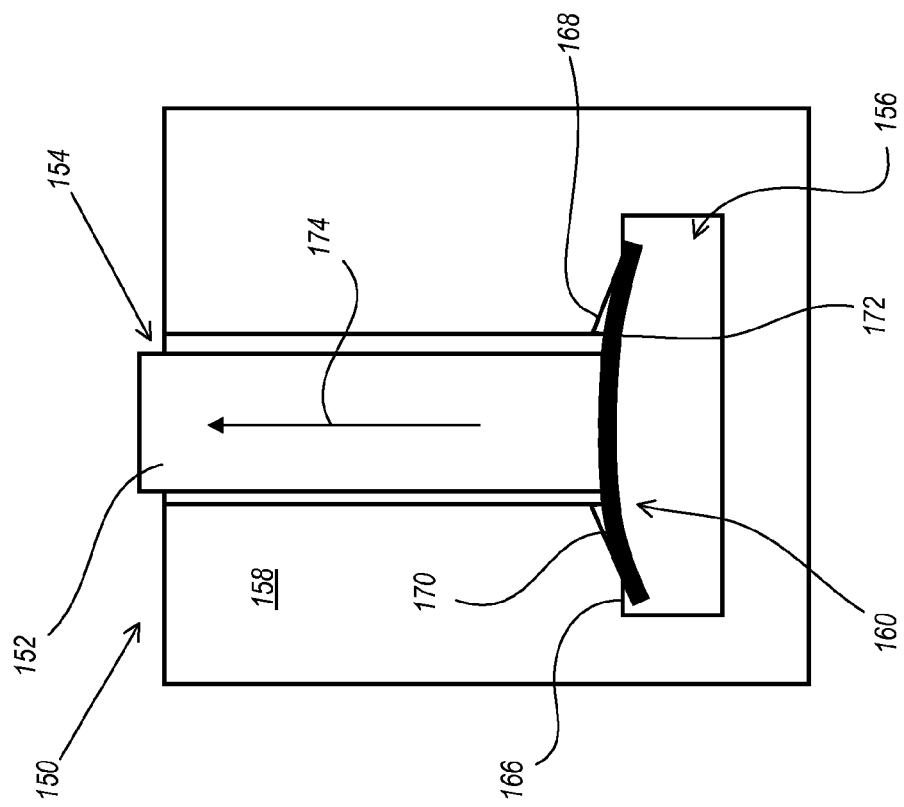
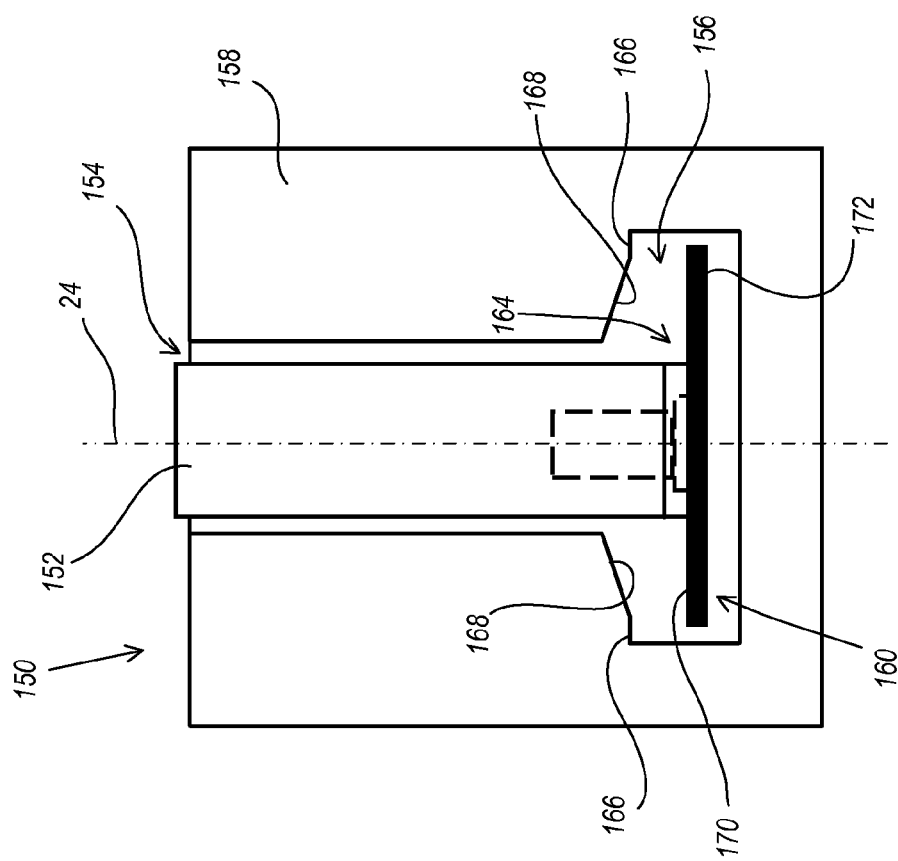
Figure 4A
Figure 4B

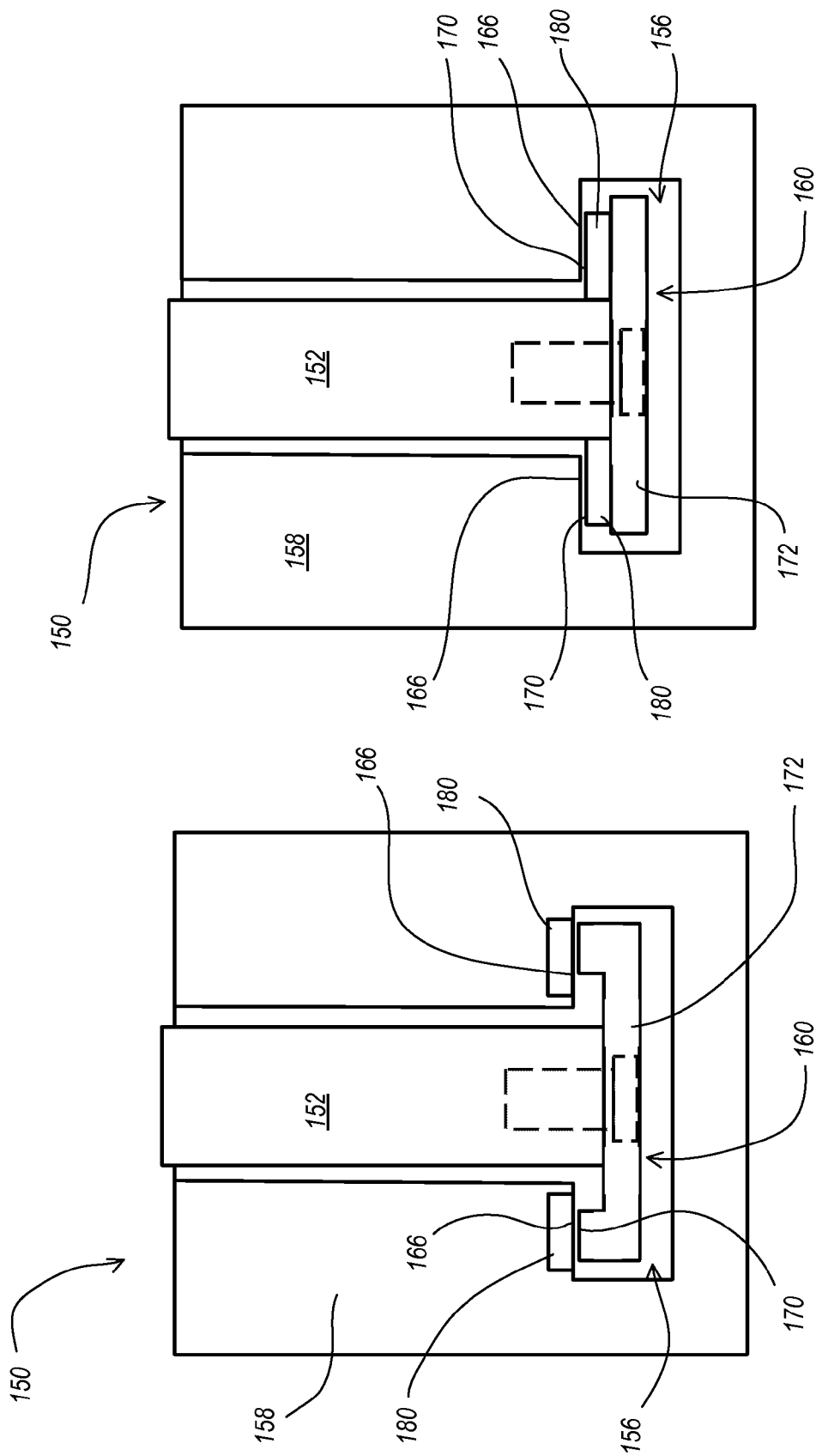

DISK DRIVE FLUID DYNAMIC BEARING SPINDLE

BACKGROUND

Hard disk drives, (HDD) are often used in electronic devices, such as computers, to record data onto or to reproduce data from a recording media, which can be a disk having one or more recording surfaces. The HDD also includes a head for reading the data on a recording surface of the disk and for writing data unto one of the surfaces. An actuator is provided for moving the head over a desired location, or track of the disk.

The HDD includes a spindle motor for rotating the disk during operation. When the disk drive is operated, and the actuator moves the head over the disk, the head is floated a predetermined height above the recording surface of the disk while the disk is rotated, and the head detects and/or modifies the recording surface of the disk to retrieve, record, and/or reproduce data from and/or onto the disk.

When the HDD is not in operation, or when the disk is not rotating, the head can be rotated by the actuator to a position such that the head is not over the disk or the recording surfaces. In this non-operational configuration, the head is "parked off" of the recording surface of the disk.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

FIG. 4A depicts a schematic cross-sectional view of a fluid bearing in accordance with one embodiment.

FIG. 4B depicts a schematic cross-sectional view of a fluid bearing in accordance with another embodiment.

FIG. 5A depicts a schematic cross-sectional view of a fluid bearing in accordance with one embodiment.

FIG. 5B depicts a schematic cross-sectional view of a fluid bearing in accordance with another embodiment.

DETAILED DESCRIPTION

Figure 1:
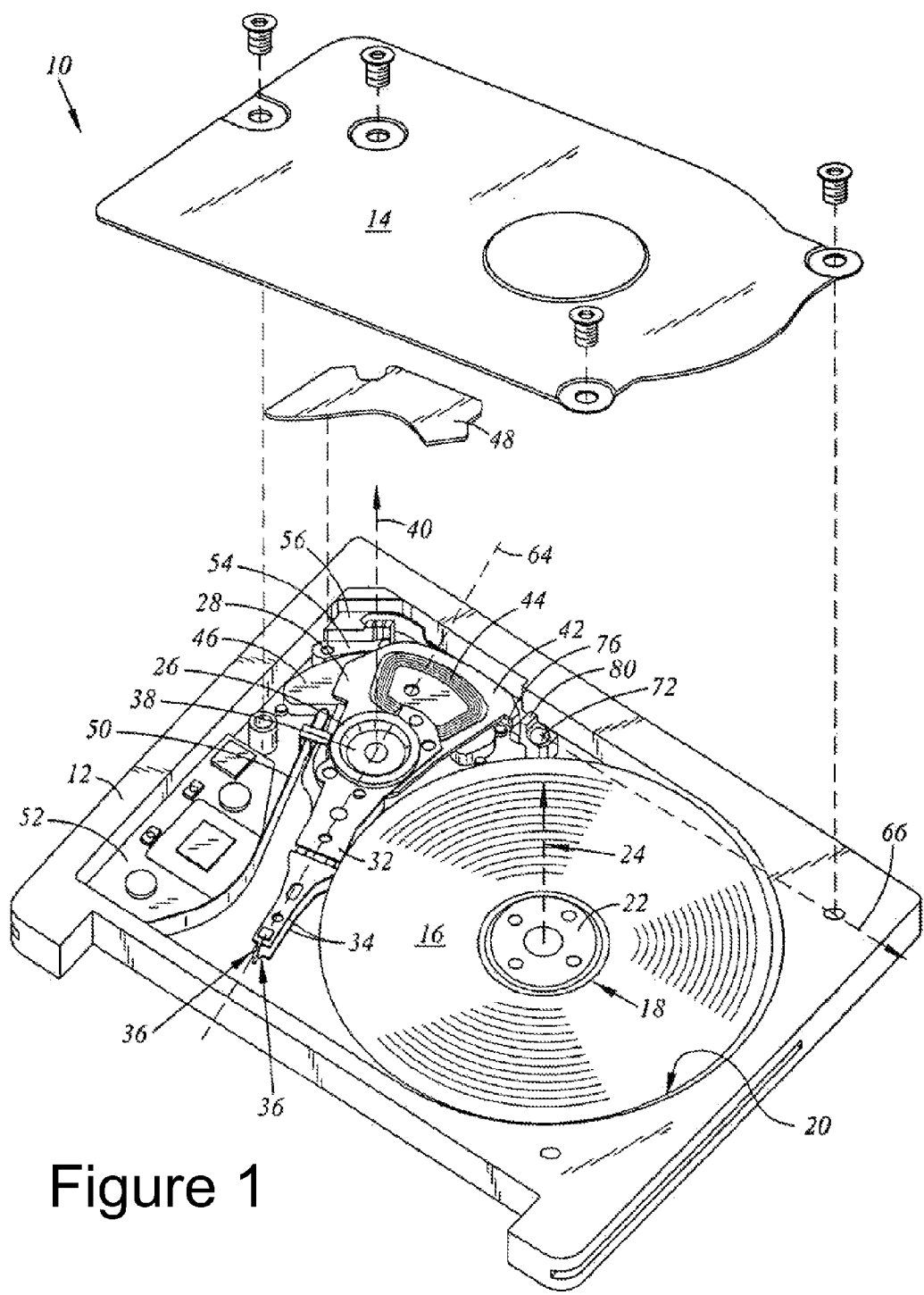
FIG. 1 depicts a perspective view of a disk drive in accordance with one embodiment.

Referring now to FIG. 1, there is depicted an exploded perspective view of a disk drive 10 according to embodiments described herein. The disk drive 10 includes a head disk assembly (HDA) and a printed circuit board assembly (PCBA). The head disk assembly includes a disk drive housing having disk drive housing members, such as a disk drive base 12 and a cover 14. The disk drive base 12 and the cover 14 collectively house at least one disk 16. A single disk or additional disks may be included in the disk drive.

The disk 16 includes an inner diameter (ID) 18 and an outer diameter (OD) 20. The disk 16 further includes a plurality of tracks on its recording surface, or face, for storing data. The disk 16 may be of a magnetic recording type of storage device, however, other arrangements (e.g., optical recording) may be utilized. The head disk assembly further includes a spindle motor 22 for rotating the disk 16 about a disk rotation axis 24. The head disk assembly further includes a head stack assembly 26 rotatably attached to the disk drive base 12 in operable communication with the disk 16. The head stack assembly 26 includes an actuator 28.

The actuator 28 includes an actuator body and at least one actuator arm 32 that extends from the actuator body. Some embodiments include multiple arms 32. Distally attached to the actuator arms 32 are suspension assemblies 34. The suspension assemblies 34 respectively support heads 36. The suspension assemblies 34 with the heads 36 are referred to as head gimbal assemblies. The number of actuator arms and suspension assemblies may vary depending upon the number of disks and disk surfaces utilized.

The head 36 can include a transducer for writing and reading data. The transducer can include a writer and a read element. In magnetic recording applications, the transducer's writer may be of a longitudinal or perpendicular design, and the read element of the transducer may be inductive or magnetoresistive.

In optical and magneto-optical recording applications, the head may also include an objective lens and an active or passive mechanism for controlling the separation of the objective lens from a disk surface of the disk 16. The disk 16 includes opposing disk surfaces. In magnetic recording applications the disk surface typically includes one or more magnetic layers. Data may be recorded along data annular regions on a single disk surface or both.

The head stack assembly 26 may be pivoted such that each head 36 is disposed adjacent to the various data annular regions from adjacent to the outer diameter 20 to the inner diameter 18 of the disk 16. In FIG. 1, the actuator body includes a bore, and the actuator 28 further includes a pivot bearing cartridge 38 engaged within the bore for facilitating the actuator body to rotate between limited positions about an axis of rotation 40.

The actuator 28 can further include a coil support element 42 that extends from one side of the actuator body opposite the actuator arms 32. The coil support element 42 is configured to support a coil 44. A VCM magnet 46 may be supported by the disk drive base 12. Posts may be provided to position the VCM magnet 46 in a desired alignment against the disk drive base 12. A VCM top plate 48 may be attached to an underside of the cover 14. The coil 44 is positioned, in some embodiments, between the VCM magnet 46 and the VCM top plate 48 to form a voice coil motor for controllably rotating the actuator 28.

The head stack assembly 26 can further include a flex cable assembly 50 and a cable connector 52. The cable connector 52 can be attached to the disk drive base 12 and is disposed in electrical communication with the printed circuit board assembly. The flex cable assembly 50 supplies current to the coil 44 and carries signals between the heads 36 and the printed circuit board assembly.

With this configuration, current passing through the coil 44 results in a torque being applied to the actuator 28. The actuator 28 includes an actuator longitudinal axis 64 which extends generally along the actuator arms 32. A change in direction of the current through the coil 44 results in a change in direction of the torque applied to the actuator 28, and consequently, the longitudinal axis 64 of the actuator arms 32 is rotated about the axis of rotation 40. It is contemplated that other magnet, VCM plate, coil and magnet support configurations may be utilized, such as a multiple coil arrangements, single or double VCM plates and a vertical coil arrangement.

The disk drive 10 can also include a latch 54. The latch 54 can include a fixed portion 56 that is firmly coupled to the disk drive base 12. The latch 54 further includes a latching portion that is engagable with fixed portion 56 to limit rotational movement of the actuator 28. Although the latch 54 is depicted as being located in a corner of the base, the latch 54 could be located in other portions of the disk drive and still perform its functions.

When the actuator 28 is rotated into the parked position, as illustrated in FIG. 1, the actuator 28 can include a contact member 76, which can be located on the coil support element 42 or elsewhere, that is configured to engage a crash stop 80 in order to limit rotation of the actuator 28 away from the disk 16. The crash stop 80 can be an integral part of the base 12, or the crash stop 80 can be connected to the base 12 via a fixation element 72. FIG. 1 depicts an axis of engagement 66 of the contact member 76 and the crash stop 80 as being in line with the fixation element 72, but other constructions are also permissible. A crash stop 80 can also be provided to limit movement of the actuator 28 toward the ID 18 of the disk 16.

Data is recorded onto a surface of the disk in a pattern of concentric rings known as data tracks. The disk surface is spun at high speed by means of a motor-hub assembly. Data tracks are recorded onto disk surface by means of the head 36, which typically resides at the end of the actuator arm 32. One skilled in the art understands that what is described for one head-disk combination applies to multiple head-disk combinations.

The dynamic performance of the HDD is a major mechanical factor for achieving higher data capacity as well as for manipulating the data faster. The quantity of data tracks recorded on the disk surface is determined partly by how well the head 36 and a desired data track can be positioned relative to each other and made to follow each other in a stable and controlled manner. There are many factors that can influence the ability of HDD to perform the function of positioning the head 36 and following the data track with the head 36. In general, these factors can be put into two categories; those factors that influence the motion of the head 36; and those factors that influence the motion of the data track. Undesirable motions can come about through unwanted vibration and undesirable tolerances of components.

During development of the HDD, the disk 16 and head 36 have undergone reductions in size. Much of the refinement and reduction has been motivated by consumer request and demand for more compact and portable hard drives 10. For example, the original hard disk drive had a disk diameter many times larger than those being developed and contemplated.

Smaller drives often have small components with relatively very narrow tolerances. For example, disk drive heads 36 are designed to be positioned in very close proximity to the disk surface. Due to the tight tolerances, vibration activity of the actuator arm 32 relative to the disk 16 can adversely affect the performance of the HDD. For example, vibration of the actuator 28 can result in variations in the spacing between the head element and media. Additionally, irregular movement of the disk 16, or vibrations caused by unbalanced rotations, can result in variations in the spacing between the head element and the disk 16, or media.

In addition, as disk drive tracks per inch (TPI) increases, sensitivity to small vibrations also increases. Small vibrations can cause significant off-track and degraded performances. For example, in many cases, variations in the spacing between the head element and media can increase the off-track complications, and the increase in TPI compounds the complications and likely gives rise to data errors. These data errors can include both hard errors during writing and soft errors during reading. Moreover, vibration-induced errors become even more apparent as the actual offset distances and overall components are reduced in size.

Figure 2:
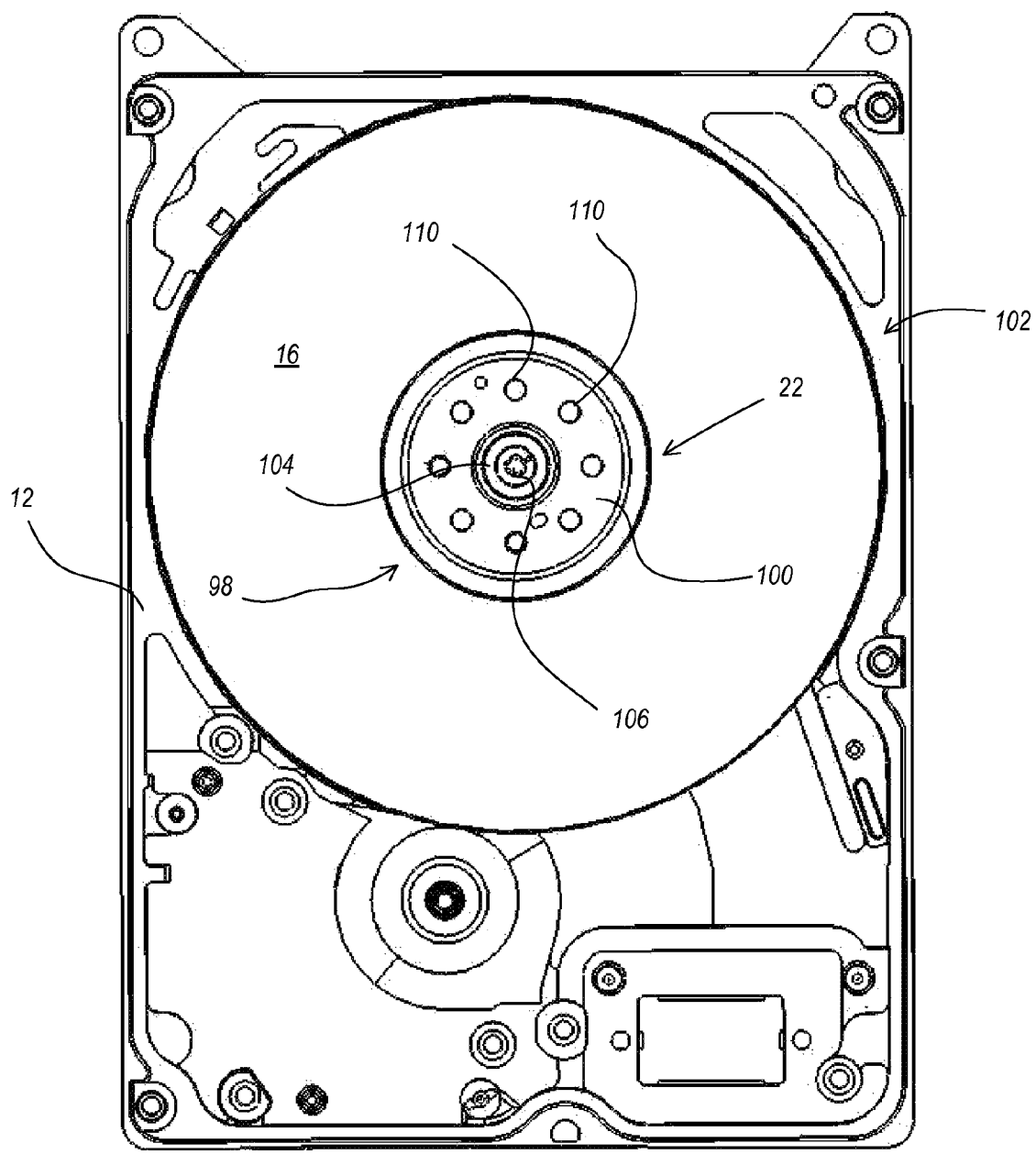
FIG. 2 illustrates a top view of a disk drive in accordance with one embodiment.

Each disk 16 is mounted on a rotatable hub 98 connected to the spindle motor 22 and is secured to the rotatable hub by a disk clamp 100, as illustrated in FIG. 2. Some disk drives 10 include a plurality of disks 16 to provide additional disk surface for storing greater amounts of data. The resulting combination is referred to herein as a motor/disk assembly or as a disk pack 102.

Multiple data storage disks 16 can be mounted on the rotatable hub 98 in vertically and substantially equally spaced relations. One or more bearings 104 are disposed between a motor or spindle shaft 106 and the rotatable hub 98, which is disposed about and rotatable relative to the spindle shaft 106. Electromagnetic forces are used to rotate the hub 98 about the stationary shaft 106 at a desired velocity. Rotational movement of the hub 98 is translated to each of the disks 16 of the disk pack 102, causing the disks 16 to rotate with the hub 98 about the shaft 106.

The disks 16 are rotated about the shaft 106 at a high rate of speed, and consumer demand for quicker data retrieval can result in increased rotational speed of the hub 98 and the disks 16 to provide reduced time in accessing data. Even minor imbalances of the rotating motor/disk assembly 102 can generate significant forces that can adversely affect the ability to accurately position the head 36 relative to the desired track of the corresponding disk 16 while reading from or writing to the disk 16. Excessive imbalance can degrade the disk drive performance not only in terms of read/write errors, but also in terms of seek times. Excessive imbalance may result in an undesirable acoustic signature and may even result in damage or excessive wear to various disk drive components.

The inner diameter 18 of each disk 16 is slightly larger in diameter than an outer periphery of the spindle motor hub, or rotatable hub 98, in order to allow the disks 16 to slip about the spindle motor hub 98 during installation. During assembly, the disks 16 may be positioned in an inexact concentric manner about the spindle motor hub 98. In fact, in some instances, the disks 16 may be intentionally biased against the spindle motor hub 98. This inexact concentric relationship between the disk 16 and the motor hub 98 results in the disk pack 102 becoming imbalanced. This imbalance can be manifest in at least two respects.

First, the rotating mass of each disk 16 results in a centrifugal force radially extending in a direction from the axis of rotation 24 in a plane orthogonal to the axis of rotation 24 that includes the axis of rotation 24. This can be referred to as a single plane or "static" imbalance. Second, the same centrifugal force also results in a moment about an axis extending from the axis of rotation 24 in a plane orthogonal to the axis of rotation through the axis of rotation 24. This can referred to as a dual plane, two plane, or "dynamic" imbalance.

Balancing of the disk pack 102 is preferably conducted, for example, by the manufacturer or during an assembly process, prior to shipping the drive 10 to the consumer. Single plane balancing of the disk pack 102 can include attaching one or more weights to one side of the disk pack 102. Not all imbalances may be alleviated to the desired degree by balancing within a single plane. Dual plane balancing of the disk pack 102 can be achieved by attaching one or more weights at two different elevations along the axis 24 corresponding with vertically spaced reference planes in an attempt to improve upon the potential inadequacies of a single plane balance.

Balancing the disk pack 102 can be accomplished by attaching one or more weights to a central portion of the disk pack 102. For example, as illustrated in FIG. 2, the disk pack 102 can have a portion that holds the one or more weights or to which the one or more weights attach. FIG. 2 illustrates a disk pack 102 having a rotatable hub 98 that includes a disk clamp 100 having a plurality of disk clamp apertures 110 positioned circumferentially about a central portion of the disk pack 102.

In addition to maintaining efficient performance of the disk drive, balancing the disk pack 102 reduces the likelihood damage to the disk drive by inadvertent impacts or contact between the recording media and the heads. Another way to reduce the likelihood of damage to and to improve performance of the disk drive 10 is by utilizing a fluid dynamic bearing with the spindle motor 22. The fluid bearing, as one of ordinary skill in the art will recognize, provides a fluid layer to act as a bearing for rotational movement of the disk pack 102.

In some embodiments, the fluid bearing can also act as a damper that limits movement of the disk pack 102 relative to the actuator 28. For example, during operation of the disk drive 10, the actuator 28 is rotated such that the head 36 is positioned over the disk 16. Axial movement of the disk pack 102 relative to the heads 36 can be caused by an inadvertent shock, jolt, or other movement of the disk drive. If the disk pack 102 is permitted to move freely, as a consequence of this operational shock, the disk 16 can impact one or more heads 36 of the actuator 28. This impact can damage a recording surface of the disks 16 or the heads 36.

Figure 3:
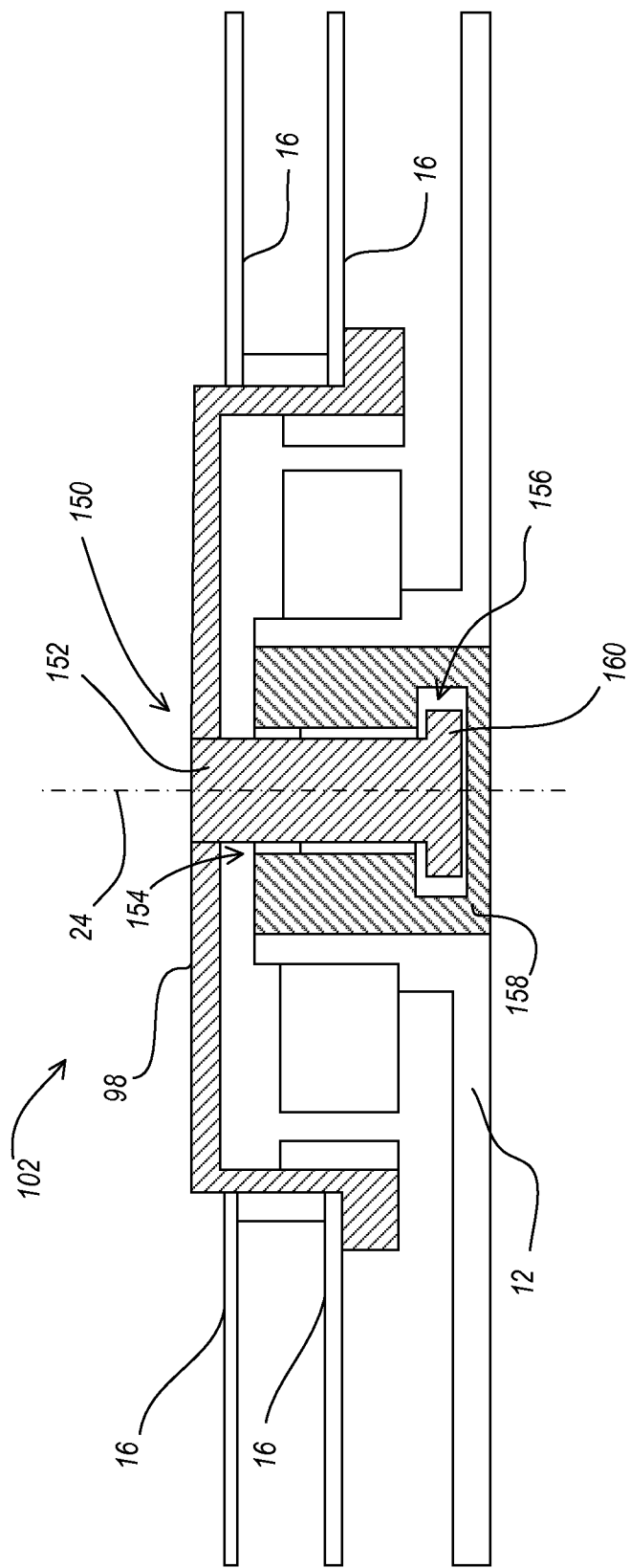
FIG. 3 depicts a schematic cross-sectional view of a disk pack in accordance with one embodiment.

FIG. 3 illustrates one embodiment of a fluid dynamic bearing that can be used in connection with a disk pack 102. That disk 102 includes one or more disks 16 that are rotatably mounted to either the base 12 or a stationary member connected to the base 12. As illustrated, the fluid bearing 150 provides rotational movement between the disks 16 and the base 12. The fluid bearing 150 can include a spindle 152 that is received within an internal bore 154 and an internal chamber 156 of a bearing sleeve 158. In some embodiments, the bearing sleeve 158 is coupled to the base 12 and a substantially stationary relative to the spindle 152 during rotation of the disks 16. Within the internal bore 154 and/or the internal chamber 156 is preferably a fluid that permits relative rotation and movement between the spindle 152 and the bearing sleeve 158. The spindle 152, preferably rotates about the axis of rotation 24 and is permitted, in some embodiments, to permit limited axial movement along the axis of rotation 24.

The spindle 152 is coupled to the spindle hub 98, which in turn, is coupled to the disks 16. In some embodiments, as illustrated, the spindle 152 is coupled to the spindle hub 98 on one end and includes a stopper 160 on an opposite end. The stopper 160 can be received within the internal chamber 156 of the bearing sleeve 158. The stopper 160 is preferably permitted to rotate within the internal chamber 156. In some embodiments, the stopper 160 has a cross-sectional dimension that is greater than a cross-sectional dimension of the internal bore 154 such that when the stopper 160 is positioned within the internal chamber 156, axial movement of the spindle 152 is limited by engagement or contact between the stopper 160 in the bearing sleeve 158.

For example, if the disk drive 10 experiences a shock, the fluid bearing 150 is configured to permit limited relative movement along the axis of rotation 24 between the disk pack 102 in the base 12. This limited relative movement can be defined or controlled by dimensions and tolerances of the stopper 160 relative to the bearing sleeve 158.

When the disk drive 10 experiences a shock, the fluid bearing 150 is configured to permit the spindle 152 to move along the axis of rotation 24. The fluid bearing 150 provides a damper of this axial movement because the fluid of the fluid bearing 150 within the internal bore 154 and the internal chamber 156 is required to adjust and flow within the fluid bearing 150 when the spindle 152 moves axially. Although the fluid bearing 150 can provide this damper, in some instances, the shock can still cause engagement between the stopper 160 and the bearing sleeve 158. This engagement between the stopper 160 and the bearing sleeve 158, if too abrupt, can damage the spindle 152, the spindle hub 98, or the disks 16.

In some embodiments, a soft material can be used on the spindle 152 or the bearing sleeve 158 to minimize or reduce impact forces generated by inadvertent engagement between the stopper 160 in the bearing sleeve 158 when the spindle 152 is the axially along the axis of rotation 24 relative to the bearing sleeve 158. For example, the soft material can be configured to elastically deform during such impacts or engagement. The soft material can be a compliant material that reduces the impact forces by deforming, at least partially, when the spindle 152 is moved axially along the axis of rotation 24 relative to the bearing sleeve 158.

FIGS. 4A and 4B illustrate one embodiment of the fluid bearing 150 having a compliant material that deforms to reduce impact forces between the spindle 152 and the bearing sleeve 158 when the spindle 152 is moved along the axis 24 relative to the bearing sleeve 158. The spindle 152 can include a stopper 160 that is preferably positioned on a bottom end 164 of the spindle 152 and resides within the internal chamber 156 of the bearing sleeve 158. The stopper 160 can include a compliant material that can elastically deform during impact between the spindle 152 in the bearing sleeve 158.

The bearing sleeve 158 defines a first contact surface 166 within the internal chamber 156 that engages the spindle 152 when the spindle is moved along the axis 24 so as to remove the spindle 152 from the bearing sleeve 158. In some embodiments, the first contact surface 166 can include a chamfer 168. That provides a transition between an orientation of the first contact surface 166 and an orientation of the internal bore 154.

The stopper 160 defines a second contact surface 170 that is configured to, at least in part, engage a portion of the first contact surface 166 when the spindle 152 is moved along the axis 24 so as to remove the spindle 152 from the bearing sleeve 158. In some embodiments, the second contact surface 170 is a portion of a disk 172 that is coupled to the end of the spindle 164.

As illustrated in FIG. 4B, some embodiments provide that the stopper 160 (e.g., the disk 172) include a compliant material that is elastically deformed when the spindle 152 is moved in the direction of the arrow 174. In one embodiment, the first contact surface 166 is engaged by the second contact surface 170 of the stopper 160, and the impact forces generated by engagement between the two surfaces 166 and 170 cause deflection of portions of the disk 172 within the internal chamber 156. The chamfer 168 of the bearing sleeve 158 the elastic deformation, or deflection, of the disk 172 by limiting the initial contact area between the first contact surface 166 and the second contact surface 170.

When the spindle 152 and is moved in the direction of arrow 174, the fluid bearing 150 provides a damper by requiring the movement of fluid around the stopper 160. For example, fluid contained within the internal bore 154 and between the first contact surface 166 in the second contact surface 170 within the internal chamber 156 is required to move around the stopper 160 within the internal chamber 156 when the spindle is moved in the direction 174. This damping effect is further accomplished with chamfer 168 by permitting the stopper 162 to deflect, or elastically deform, when the first contact surface 166 is engaged by the second contact surface 170.

Although the description provides herein that the first contact surface 166 engages the second contact surface 170, this disclosure contemplates that the forces generated by the translation of fluid within the internal bore 154 and within various portions of the internal chamber 156 can cause the elastic deformation of the compliant material with actual contact between the first contact surface 166 in the second contact surface 170.

FIGS. 5A and 5B illustrate additional embodiments of fluid bearings 150 that include a soft, or compliant, material for damping axial movement of the spindle 152 relative to the bearing sleeve 158. In FIG. 5A, the bearing sleeve 158 can include, along a portion of the internal chamber 156, damping material 180 that can be compressed or elastically deformed when engaged by a portion of the spindle 152.

For example, the stopper 160 can have an outer periphery of the disk 172 that is elevated from the remainder of the disk 172 to define the second contact surface 170. In this example, axial movement of the spindle 152 will cause the second contact surface 170 to engage the bearing sleeve 158 without the remainder of the disk 172 or stopper 160 engaging the bearing sleeve 158. The bearing sleeve 158 can include damping material 180 within a surface of the anterior chamber 156 to define a first contact surface 166. In some embodiments, the damping material 180 can be an annular ring of compliant material that is inset within the bearing sleeve 158 internal chamber 156 to define a first contact surface 166. Accordingly, when the spindle 152 is withdrawn from within the bearing sleeve 158 the second contact surface 170 of the stopper 160 engages the first contact surface 166, including the damping material 180, and causes compression or elastic deformation of again for material 180.

FIG. 5B provides that the stopper 160 can include an annular disk of damping material 180 attached thereto. The damping material 180 can define the second contact surface 170 such that when the spindle 152 is axially moved so as to be withdrawn from the bearing sleeve 158, the damping material 180 is compressed between the stopper 160 in the first contact surface 166 of the bearing sleeve 158. In some embodiments, the damping material 180 can be a continuous annular disk that is coupled to the spindle 152 in the stopper 160, and in other embodiments, the damping material 180 can be a discontinuous structure that is positioned about the disk 172.

Figure 6:
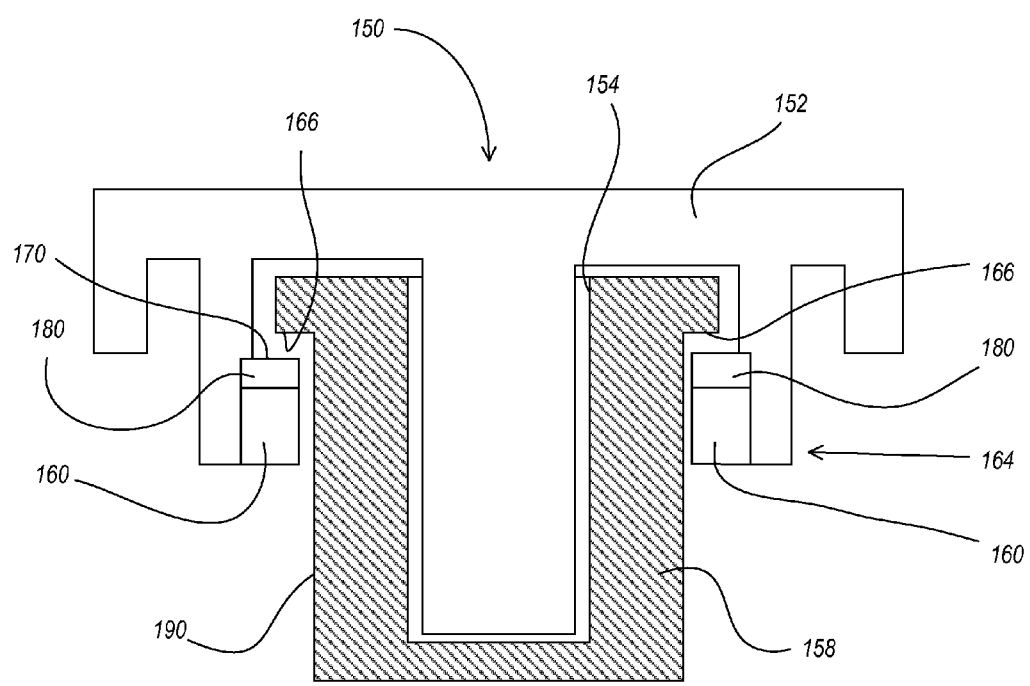
FIG. 6 depicts a schematic cross-sectional view of a fluid bearing in accordance with one embodiment.

FIG. 6 illustrates one embodiment that provides spindle 152 with a stopper 160 positioned about an exterior surface 190 of the bearing sleeve 158. In this embodiment, the internal bore 154 is defined by the bearing sleeve 158, but there is no need for any internal chamber that has a cross-sectional dimension greater than that of the internal bore 154, because the bearing sleeve 158 does not need to accommodate the stopper therein. The bearing sleeve 158 preferably includes a laterally extending surface, or a surface that extends transversely to the axis of rotation 24, that defines the first contact surface 166.

At the end of the spindle 164, the spindle 152 includes a laterally extending surface, or a surface extending transverse to the axis of rotation 24, that defines the stopper 160. Positioned about the stopper 160, and preferably between the stopper 160 in the first contact surface 166 of the bearing sleeve 158, is the damping material 180 that defines the second contact surface 170, such that when the spindle 152 is axially moved along the axis of rotation 24 so as to remove the spindle 152 from the bearing sleeve 158, the second contact surface 170 engages the first contact surface 166 and compresses the damping material 180. In some embodiments, the damping material 180 can be positioned about the latter league extending surface of the bearing sleeve 158 instead of being positioned about the stopper 160 of the spindle 152. Some embodiments provide that the damping material 180 can be a continuous annular ring, and other embodiments provide an identity material 180 can be discontinuous or disjointed.

The fluid bearings 150 described herein can produce a greater damping force, which can prevent or reduce the likelihood of motor internal collision and greatly reduces the impact magnitude. Additionally, the fluid bearings can yield higher operational shock performances.

In one embodiment, a disk drive 10 can include a bearing sleeve 158 that defines an internal bore 154 that extends from an external portion of the sleeve to an internal portion along an axis 24 defined by the bore 154. The bearing sleeve 158 can have a first contact surface 166 that extends in a direction transverse to the axis 24. The disk drive 10 can also includes a spindle 152 that is rotationally received by the bore 154, such that the spindle 152 and the sleeve 158 permit relative rotational movement. A stopper 160 can be positioned on the spindle 152, and the stopper 160 can provide a second contact surface 170 that is configured to engage the first contact surface 166 upon relative axial movement between the spindle 152 and the sleeve 158. In some embodiments, a portion of at least one of the first and second contact surfaces 166, 170 includes a softer material than that of the spindle 152 and the bearing sleeve 158. In some embodiments, the softer material is a compliant material that can elastically deform during an operational shock event.

In some embodiments, the softer material includes a modulus of elasticity that is different than that of at least one of the spindle 152 and the bearing sleeve 158. In some embodiments, a portion of at least one of the first and second contact surfaces 166, 170 includes a material that has a lower modulus of elasticity than that of at least one of the spindle 152 and the bearing sleeve 158. In some embodiments, a portion of at least one of the first and second contact surfaces 166, 170 includes a material that has a higher modulus of elasticity than that of at least one of the spindle 152 and the bearing sleeve 158.

In one embodiment, the bearing sleeve 158 defines an internal chamber 156, in communication with the internal bore 154, and the internal chamber 156 can have a greater radial dimension from the axis 24 than that of the internal bore 154. In one embodiment, the stopper 160 has a cross-sectional dimension greater than that of the internal bore 154. Some embodiments provide that the internal chamber 156 is sized and configured to receive the stopper 160 therein and to substantially prevent axial withdrawal of the spindle 152 from the internal bore 154.

In one embodiment, the stopper 160 includes a compliant material that elastically deforms when an axial force is applied to withdraw the spindle 152 from the internal bore 154. In some embodiments, the bearing sleeve 158 defines an angled chamfer 168 as a transition between the first contact surface 166 and the internal bore 154. The stopper can include a disk 172 on one end 164 of the spindle 152.

Some embodiments provide that the second contact surface 170 includes the softer, or compliant, material extending along a face of the disk 172. The softer material is preferably positioned, sized, and configured to engage the sleeve first contact surface 166 when an axial force is applied to the spindle 152 to withdraw the spindle 152 from the bore 154. In some embodiments, the first contact surface 166 includes the softer, or compliant, material extending along the first contact surface 166 about the axis 24. The softer material is preferably positioned, sized, and configured to engage the second contact surface 170 when an axial force is applied to the spindle 152 to withdraw the spindle 152 from the bore 154.

In one embodiment, a fluid bearing includes a sleeve that defines a bore extending through a portion of the sleeve and along an axis defined by the bore. The sleeve preferably includes a first contact surface that extends in a direction transverse to the axis. The fluid bearing also includes a spindle rotationally received within the bore. The spindle and the sleeve permit relative rotational movement when the spindle is positioned within the bore, and the spindle preferably includes a stopper with a second contact surface that extends in a direction transverse to the axis when the spindle is positioned within the bore. A portion of at least one of the first and second contact surfaces includes a softer material than that of the spindle and the bearing sleeve, and in some embodiments, the first and second contact surfaces are configured to engage each other upon relative axial movement between the spindle and the sleeve.

The sleeve preferably defines an internal chamber, in communication with the internal bore, that has a greater cross-sectional dimension than that of the internal bore. In some embodiments, the stopper has a cross-sectional dimension greater than that of the internal bore. The internal chamber is preferably sized and configured to receive the stopper therein and to resist axial withdrawal of the spindle from the internal bore once the stopper is positioned within the internal chamber. In some embodiments, the stopper includes a compliant material that elastically deforms when an axial force is applied to withdraw the spindle from the internal bore. Some embodiments provide that the compliant material comprises a metal having a high-yield strength. In some embodiments, the sleeve defines a chamfer, angled transverse to the axis, as a transition between the first contact surface and the internal bore.

The spindle, in some embodiments, provides that the stopper has a disk positioned on one end of the spindle. In some embodiments, the disk is a substantially solid disk, and in other embodiments, the disk is an annular ring that defines a central opening portion. In some embodiments, the disk is positioned within the internal chamber of the bearing sleeve, and in other embodiments, the disk can substantially encircle a portion of an outer portion of the bearing sleeve, as illustrated in FIG. 6.

In some embodiments, the second contact surface includes the softer material extending along a face of the disk, and the softer material can be size, configured, and positioned to engage the sleeve first contact surface when an axial force is applied to the spindle to withdraw the spindle from the bore. In further embodiments, the first contact surface includes the softer material extending along the first contact surface about the axis, the softer material is size, configured, and positioned to engage the second contact surface when an axial force is applied to the spindle to withdraw the spindle from the bore.

The description of the invention is provided to enable any person skilled in the art to practice the various embodiments described herein. While the embodiments have been particularly described with reference to the various figures and disclosure, it should be understood that these are for illustration purposes only and should not be taken as limiting the scope of the inventions.

There may be many other ways to implement the embodiments. Various functions and elements described herein may be partitioned differently from those shown without departing from the spirit and scope of the disclosure. Various modifications to these embodiments will be readily apparent to those skilled in the art, and generic principles defined herein may be applied to other embodiments. Thus, many changes and modifications may be made to embodiments, by one having ordinary skill in the art, without departing from the spirit and scope of the disclosure.

A reference to an element in the singular is not intended to mean "one and only one" unless specifically stated, but rather "one or more." The term "some" refers to one or more. Any headings and subheadings are used for convenience only, do not limit the disclosure, and are not referred to in connection with the interpretation of the description of the disclosure. All structural and functional equivalents to the elements of the various embodiments described throughout this disclosure that are known or later come to be known to those of ordinary skill in the art are expressly incorporated herein by reference and intended to be encompassed by the disclosure. Moreover, nothing disclosed herein is intended to be dedicated to the public regardless of whether such disclosure is explicitly recited in the above description.

What is claimed is:

1. A disk drive comprising:
    a bearing sleeve defining an internal bore extending from an external portion of the sleeve to an internal portion along an axis defined by the bore, the bearing sleeve including a first contact surface that extends in a direction transverse to the axis;
    a spindle rotationally received by the bore such that the spindle and the sleeve permit relative rotational movement; and
    a stopper positioned on the spindle, the stopper including a second contact surface that is configured to engage the first contact surface upon relative axial movement between the spindle and the sleeve;
    wherein at least one of the first and second contact surfaces comprises a softer material than that of the spindle and the bearing sleeve such that the softer material elastically deforms when the second contact surface engages the first contact surface upon relative axial movement between the spindle and the sleeve.

2. The disk drive of claim 1, wherein the bearing sleeve defines an internal chamber, in communication with the internal bore, the internal chamber having a greater radial dimension from the axis than that of the internal bore.

3. The disk drive of claim 2, wherein the stopper comprises a cross-sectional dimension greater than that of the internal bore.

4. The disk drive of claim 3, wherein the internal chamber is sized and configured to receive the stopper therein and to substantially prevent axial withdrawal of the spindle from the internal bore.

5. The disk drive of claim 4, wherein the stopper comprises a compliant material that elastically deforms when an axial force is applied to withdraw the spindle from the internal bore.

6. The disk drive of claim 4, wherein the bearing sleeve defines an angled chamfer as a transition between the first contact surface and the internal bore.

7. The disk drive of claim 1, wherein the stopper comprises a disk positioned on one end of the spindle.

8. The disk drive of claim 7, wherein the second contact surface comprises the softer material extending along a face of the disk, the softer material being configured to engage the sleeve first contact surface when an axial force is applied to the spindle to withdraw the spindle from the bore.

9. The disk drive of claim 7, wherein the first contact surface comprises the softer material extending along the first contact surface about the axis, the softer material being configured to engage the second contact surface when an axial force is applied to the spindle to withdraw the spindle from the bore.

10. A dynamic fluid bearing comprising:
   a sleeve defining a bore extending through a portion of the sleeve along an axis defined by the bore, the sleeve including a first contact surface that extends in a direction transverse to the axis;
   a spindle rotationally received within the bore, the spindle and the sleeve permitting relative rotational movement when the spindle is positioned within the bore, the spindle comprising a stopper including a second contact surface that extends in a direction transverse to the axis when the spindle is positioned within the bore;
   wherein at least one of the first and second contact surfaces comprises a softer material than that of the spindle and the bearing sleeve, and wherein the first and second contact surfaces are configured to engage each other upon relative axial movement between the spindle and the sleeve such that the softer material elastically deforms.

11. The bearing of claim 10, wherein the sleeve defines an internal chamber, in communication with the internal bore, the internal chamber having a greater cross-sectional dimension than that of the internal bore.

12. The bearing of claim 11, wherein the stopper comprises a cross-sectional dimension greater than that of the internal bore.

13. The bearing of claim 12, wherein the internal chamber is sized and configured to receive the stopper therein and to resist axial withdrawal of the spindle from the internal bore.

14. The bearing of claim 13, wherein the stopper comprises a compliant material that elastically deforms when an axial force is applied to withdraw the spindle from the internal bore.

15. The bearing of claim 14, wherein the compliant material comprises a metal having a high-yield strength.

16. The bearing of claim 13, wherein the sleeve defines a chamfer, angled transverse to the axis, as a transition between the first contact surface and the internal bore.

17. The bearing of claim 10, wherein the stopper comprises a disk positioned on one end of the spindle.

18. The bearing of claim 17, wherein the second contact surface comprises the softer material extending along a face of the disk, the softer material being configured to engage the sleeve first contact surface when an axial force is applied to the spindle to withdraw the spindle from the bore.

19. The bearing of claim 17, wherein the first contact surface comprises the softer material extending along the first contact surface about the axis, the softer material being configured to engage the second contact surface when an axial force is applied to the spindle to withdraw the spindle from the bore.

* * * * *